D. Cary,

Horse Power.

Nº 4,595. Patented June 27, 1846.

UNITED STATES PATENT OFFICE.

DANIEL CAREY, OF CLARKSON, NEW YORK.

HORSE-POWER.

Specification of Letters Patent No. 4,595, dated June 27, 1846.

*To all whom it may concern:*

Be it known that I, DANIEL CAREY, of Clarkson, in the county of Monroe and State of New York, have made a new and useful Improvement in the Manner of Constructing Horse-Powers; and I do hereby declare that the following is a full and exact description thereof.

The horse or horses that are to actuate the machine, are made to draw upon sweeps, or levers projecting out from a main driving wheel placed horizontally and turning on a center on the frame work of the machine, as in many other horse powers. This main driving wheel has teeth on its inner edge, and these teeth gear into pinions placed on the upper ends of two vertical shafts, standing diametrically opposite to each other, and directly above the horizontal line shaft by which the power is to be communicated from the horse power to any machine that is to be driven by its means.

On the lower ends of the two vertical shafts, there are two bevel wheels, which gear into two bevel pinions on the line shaft; the stress upon the main driving wheel is consequently equalized by the power being communicated from it on its two opposite sides, and this power is communicated to the line shaft also, at two points distant from each other, this distance being nearly equal to the diameter of the main driving wheel. The vertical shaft that is nearest the fore end of the line shaft has its step on a bridge above the said shaft, this being necessary in order to allow the line shaft to pass along under it.

Figure 1:
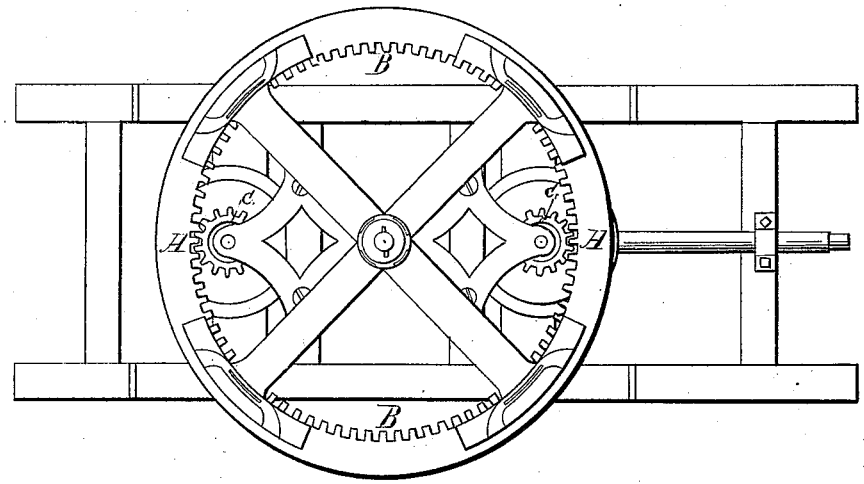
Figure 2:
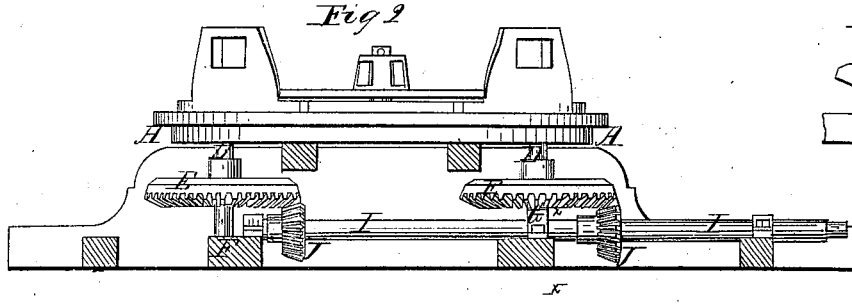
Figure 3:
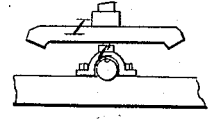

In the accompanying drawings Figure 1 is a top view of my machine; Fig. 2 a side elevation of it, and Fig. 3 a sectional view of the line shaft and of the bridge through which it passes in the line $x$—$x$ of Fig. 2.

A A is the master, or main driving wheel to which the sweeps are attached on which the horses operate. This wheel has teeth on the inner edge of its rim as seen at B B; these gear into pinions C, C, on the vertical shafts D, D'. Upon these shafts are the two bevel wheels E E; the shaft D may have its step in the piece F of the frame, in rear of the line shaft I, I; but to enable this line shaft to pass immediately under the shaft D', this shaft has its step on a bridge piece G within which the line shaft revolves freely. Upon the line shaft there are two bevel pinions J, J, which are driven respectively by the bevel wheels E E.

Having thus fully described the manner in which I construct my horse power, what I claim therein as new and desire to secure by Letters Patent is—

The special arrangement and combination of the gearing as herein set forth, said gearing consisting of the single large wheel A driving two pinions C C on the shafts of the two horizontal wheels E which horizontal wheels gear into two pinions J J on the line shaft, there being a bridge G to admit of the passage of the line shaft; the whole arrangement being substantially the same with that herein represented and made known.

DANIEL CAREY.

Witnesses:
WASHINGTON GIBBONS,
JOHN A. PITTS.